(12) United States Patent
Shiono

(10) Patent No.: US 7,132,145 B2
(45) Date of Patent: Nov. 7, 2006

(54) VIBRATION WELDING STRUCTURE FOR FIXING INSTRUMENT PANEL ATTACHMENT

(75) Inventor: Masamitsu Shiono, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/501,243

(22) PCT Filed: Jun. 4, 2003

(86) PCT No.: PCT/JP03/07072

§ 371 (c)(1),
(2), (4) Date: Jul. 12, 2004

(87) PCT Pub. No.: WO2004/022315

PCT Pub. Date: Mar. 18, 2004

(65) Prior Publication Data

US 2005/0064133 A1 Mar. 24, 2005

(30) Foreign Application Priority Data

Aug. 29, 2002 (JP) ............................. 2002-251402

(51) Int. Cl.
*B23B 3/06* (2006.01)

(52) U.S. Cl. ........................ 428/57; 156/73.5

(58) Field of Classification Search .................. 428/57, 428/58, 119, 174; 156/73.5; 296/70, 72; 180/90
See application file for complete search history.

(56) References Cited

U.S. PATENT DOCUMENTS 6,352,752 B1 * 3/2002 Nakajima et al. ............. 428/60
6,588,970 B1 * 7/2003 Natrop ....................... 403/270

FOREIGN PATENT DOCUMENTS

DE 92 00 239 U1 3/1992
EP 0 483 563 A2 5/1992

* cited by examiner

*Primary Examiner*—Alexander S. Thomas
(74) *Attorney, Agent, or Firm*—Rankin, Hill, Porter & Clark LLP

(57) ABSTRACT

In a vibration welding structure for fixing an attachment to an instrument panel (12), a first projection (70) resiliently deformable in a predetermined vibrating direction is provided on the instruction panel (12) so as to project from the instrument panel (12) toward an air conditioner duct (15). A first fitting groove portion (72) is formed in the air conditioner duct (15) for fitting engagement with a distal end portion (70a) of the first projection (70). Further, a first positioning mechanism (74) is provided between the instrument panel (12) and the air conditioner duct (15) for positioning the air conditioner duct 15 in a direction perpendicular to the vibrating direction.

2 Claims, 14 Drawing Sheets

VIBRATION WELDING STRUCTURE FOR FIXING INSTRUMENT PANEL ATTACHMENT

BACKGROUND OF THE INVENTION

1. TECHNICAL FIELD

The present invention relates to vibration welding structures for fixing an attachment to an instrument panel.

2. DESCRIPTION OF RELATED ART

Generally, in motor vehicles, an air conditioning duct is fixed to the back side of an instrument panel that is provided in front of a vehicle compartment, and cool or warm air is blown out from the air conditioning duct, through air blow-off apertures of the instrument panel, into the vehicle compartment.

As one method for attaching the air conditioning duct to the instrument panel, Japanese Patent Laid-Open Publication No. HEI-11-321287 for "Air Conditioning Duct and Method for Manufacturing and Installing the Air Conditioning Duct" discloses vibration welding one example of the disclosed vibration welding will be explained below with reference to the drawings.

FIGS. 16A to 16C are views explanatory of the conventional vibration welding structure for fixing an instrument panel attachment, and the following description will be made with the terms "instrument panel" and "air conditioning duct", used in the laid-open publication, replaced with other terms "base member" and "attachment", respectively.

As shown in FIG. 16A, a plurality of ribs 153 are formed on opposite end portions 151 and 152 of the base member 150, and the base member 150 is set in place with the ribs 153 oriented upward.

Then, the attachment 155 is positioned over the base member 150 and then lowered as depicted by arrows, so that opposite end portions 156 and 157 are placed on the ribs 153 of the base member 150.

Then, as shown in FIG. 16B, the attachment 155 is vibrated in a direction of arrows while a predetermined pressing force F is applied to the opposite end portions 156 and 157 of the attachment 155.

Due to the vibration of the attachment 155, friction heat is produced in contacts 158 between the ribs 153 of the base member 150 and the opposite end portions 156 and 157 of the attachment 155.

Then, as shown in FIG. 16C, the ribs 155 of the base member 150 and the opposite end portions 156 and 157 of the attachment 155 are vibration-welded together, so that the attachment 155 can be securely fixed to the base member 150.

Here, in order to vibration-weld the base member 150 and attachment 155, there is a need to freely vibrate the attachment 155 in an arrowed direction shown in FIG. 16A. Thus, if the attachment 155 is set on a predetermined position of the base member 150 with commonly-used positioning members, then vibration of the attachment 155 would be significantly restricted by the presence of the positioning members so that the attachment 155 can not be vibrated freely in the arrowed direction.

Because the attachment 155 to be vibration-welded to the base member 150 cannot be positioned properly with the commonly-employed positioning members as noted above, it is necessary for a human operator to set the attachment 155 on an appropriate position of the base member through a visual check or otherwise.

Consequently, the operations for setting the attachment 155 on the predetermined position of the base member tend to be time-consuming and impose a heavy load on the human operator, thereby undesirably preventing improved productivity.

It is therefore an object of the present invention to provide a vibration welding structure for fixing an instrument panel attachment which allows the attachment to be readily set on a predetermined position of the instrument panel without imposing a heavy load on a human operator.

BRIEF SUMMARY OF THE INVENTION

In order to accomplish the above-mentioned object, there is provided a vibration welding structure for fixing an instrument panel attachment wherein the attachment is vibration-welded to an instrument panel by first positioning the attachment on and along the instrument panel and then vibrating either one of the instrument panel and the attachment. The vibration welding structure of the present invention is characterized in that a projection resiliently deformable in a predetermined vibrating direction is provided on one of the instrument panel and the attachment so as to project toward the other of the instrument panel and the attachment, and in that a fitting portion is provided in the other of the instrument panel and the attachment for fitting engagement with a distal end portion of the projection.

In the present invention, the projection is provided on one of the instrument panel and the attachment so as to project toward the other of the instrument panel and the attachment, while the fitting portion is provided in the other of the instrument panel and the attachment for fitting engagement with the distal end portion of the projection. Thus, in setting the attachment on the instrument panel, the present invention allows the attachment to be readily positioned on a predetermined location of the instrument panel by merely fitting the fitting groove portion around the projection.

Also, in the present invention, the positioning projection, which is resiliently deformable, allows either the attachment or the instrument panel to be vibrated appropriately, so that the attachment can be vibration-welded to the instrument panel.

With the arrangements that the positioning projection is resiliently deformable and the fitting portion is fittingly engageable with the distal end portion of the projection, the attachment can be readily set on the predetermined position of the instrument panel and then vibration-welded to the instrument panel in an appropriate manner.

The present invention is also characterized in that a positioning mechanism for positioning the attachment relative to the instrument panel in a direction perpendicular to the predetermined vibrating direction is provided between the instrument panel and the attachment.

Thus, in setting the attachment on the instrument panel, the present invention allows the attachment to be readily positioned appropriately not only in the vibrating direction but also in the direction perpendicular to the vibrating direction.

DETAILED DESCRIPTION OF THE INVENTION

Now, a description will be given about embodiments of the present invention with reference to the accompanying drawings.

Here, the terms "front", "rear", "left" and "right" represent directions as viewed from a human operator.

Figure 1:
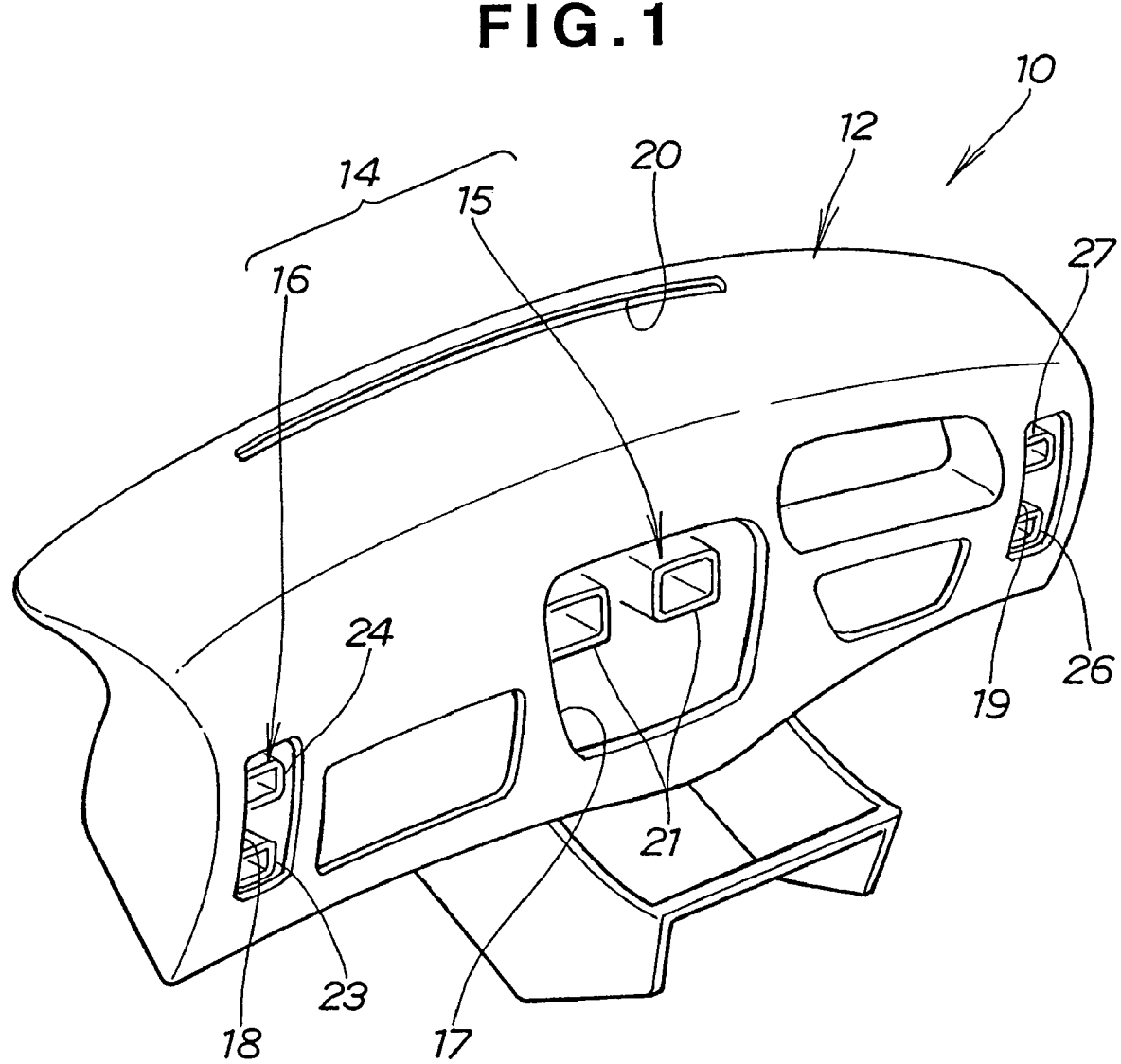
FIG. 1 is a front perspective view of a vibration welding structure for fixing an instrument panel attachment in accordance with the present invention.

FIG. 1 is a perspective view of a vibration welding structure for fixing an instrument panel attachment in accordance with the present invention. The vibration welding structure 10 includes an instrument panel 12 provided in front of a compartment of a vehicle (not shown), and an air conditioning duct unit (attachment) 14 to be fixed, via vibration welding, to the back (i.e., surface adjacent to an engine room) of the instrument panel 12.

The air conditioning duct unit 14 includes an air conditioner duct (hereinafter referred to as an "A/C" duct) 15 and a defroster duct 16.

As an example, the instrument panel 12 and air conditioning duct unit 14 may be formed of olefin-based thermoplastic resin. Because the instrument panel 12 and air conditioning duct unit 14 are formed of thermoplastic resin, the two components 12 and 14 can be joined together via vibration welding.

The instrument panel 12 has a central opening 17 and left and right openings 18 and 19 near its left and right ends, and it also includes a slit-shaped defroster opening 20 in its upper front end portion.

The central opening 17 is an opening of an inverted trapezoidal shape in which various meters and various warning lamps are mounted and via which central blowoff openings 21 of the A/C duct 15 face and communicate with the vehicle compartment.

The left opening 18 of the instrument panel 12 is an opening having a rectangular shape, via which a left blowoff opening 23 of the A/C duct 15 faces and communicates with a left region of the vehicle compartment and a left blowoff opening 24 of the defroster duct 16 faces and communicates with a left region of the vehicle compartment.

The right opening 19 of the instrument panel 12 is an opening having a rectangular shape, via which a right blowoff opening 26 of the A/C duct 15 faces and communicates with a right region of the vehicle compartment and a right blowoff opening 27 of the defroster duct 16 faces and communicates with a right region of the vehicle compartment.

The slit-shaped defroster opening 20 is formed for allowing a central blowoff opening 29 (FIG. 3) of the defroster duct 16 to face and communicate with the vehicle compartment.

Figure 2:
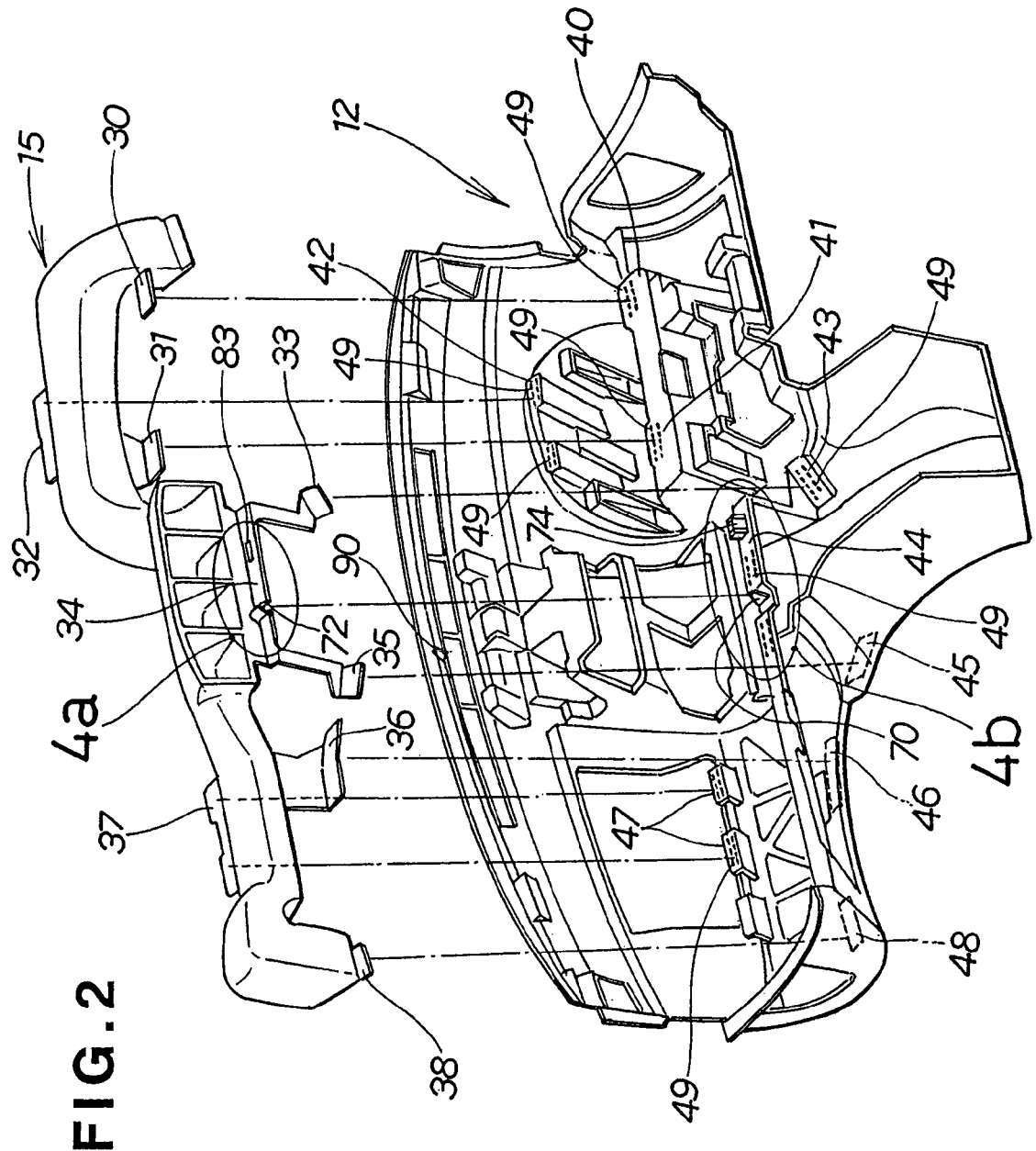
FIG. 2 is a rear exploded perspective view of the vibration welding structure for fixing an instrument panel attachment in accordance with the present invention, which particularly shows relationship between an instrument panel and an air conditioning duct.
Figure 3:
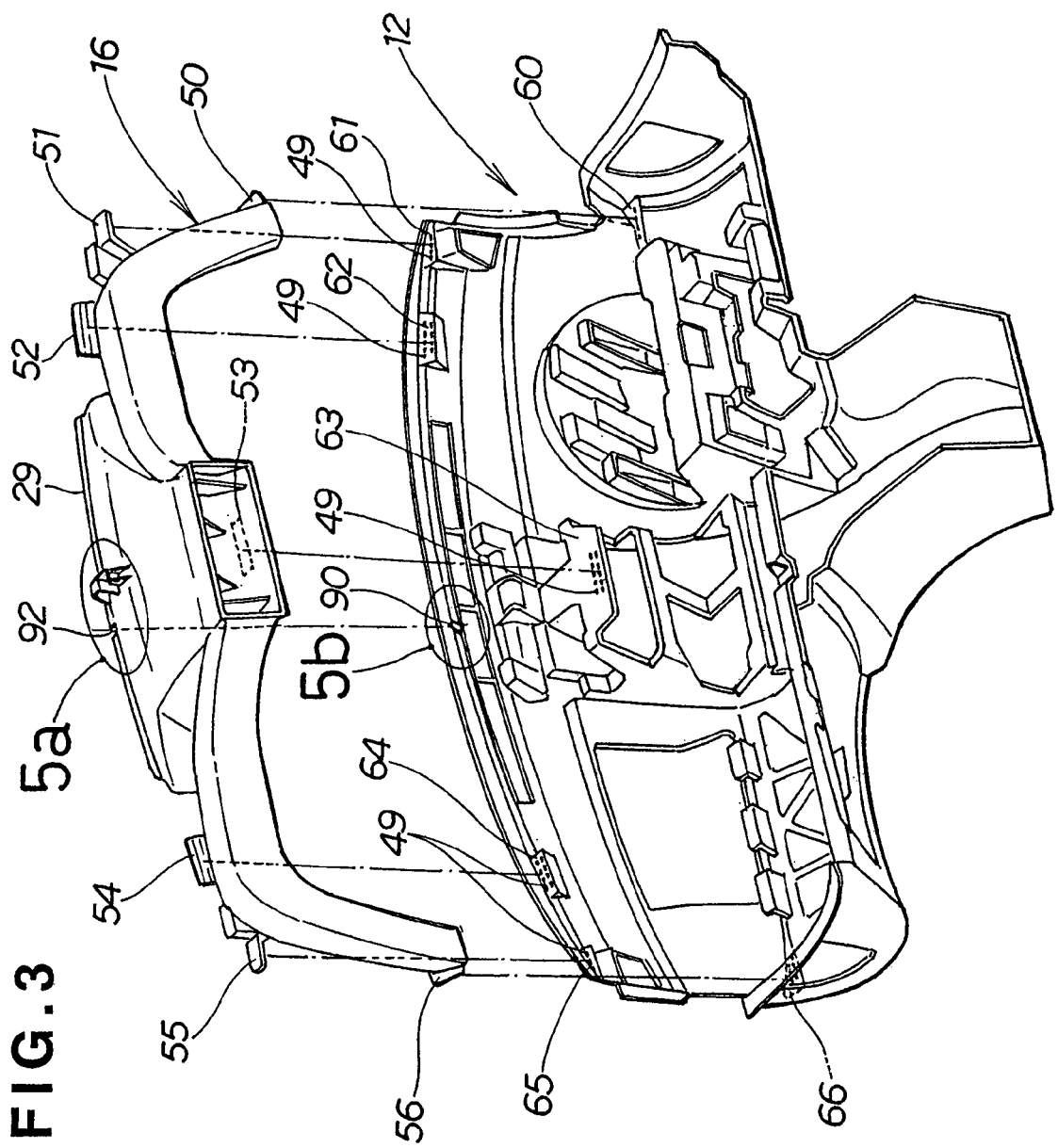
FIG. 3 is a rear exploded perspective view of the vibration welding structure for fixing an instrument panel attachment in accordance with the present invention, which particularly shows relationship between the instrument panel and a defroster duct.

FIG. 2 is a rear exploded perspective view of the vibration welding structure for fixing an instrument panel attachment in accordance with the present invention, which particularly shows relationship between the instrument panel and the A/C duct. FIG. 3 is a rear exploded perspective view of the vibration welding structure for fixing an instrument panel attachment in accordance with the present invention, which particularly shows relationship between the instrument panel and the defroster duct.

As shown in FIG. 2, the A/C duct 15 includes a series of first to ninth duct welding portions 30–38 formed from the left end to the right end thereof, and the instruction panel 12 includes first to ninth panel welding portions 40–48 so as to correspond in position to the first to ninth duct welding portions 30–38 of the A/C duct 15. Each of the first to ninth panel welding portions 40–48 has welding ribs 49.

As shown in FIG. 3, the defroster duct 16 includes a series of tenth to sixteenth duct welding portions 50–56 formed from the left end to the right end thereof, and the instruction panel 12 includes tenth to sixteenth panel welding portions 60–66 so as to correspond in position to the tenth to sixteenth duct welding portions 50–56 of the defroster duct 16.

Each of the tenth to sixteenth panel welding portions 60–66 has welding ribs 49 similarly to the first to ninth panel welding portions 40–48.

Figure 4:
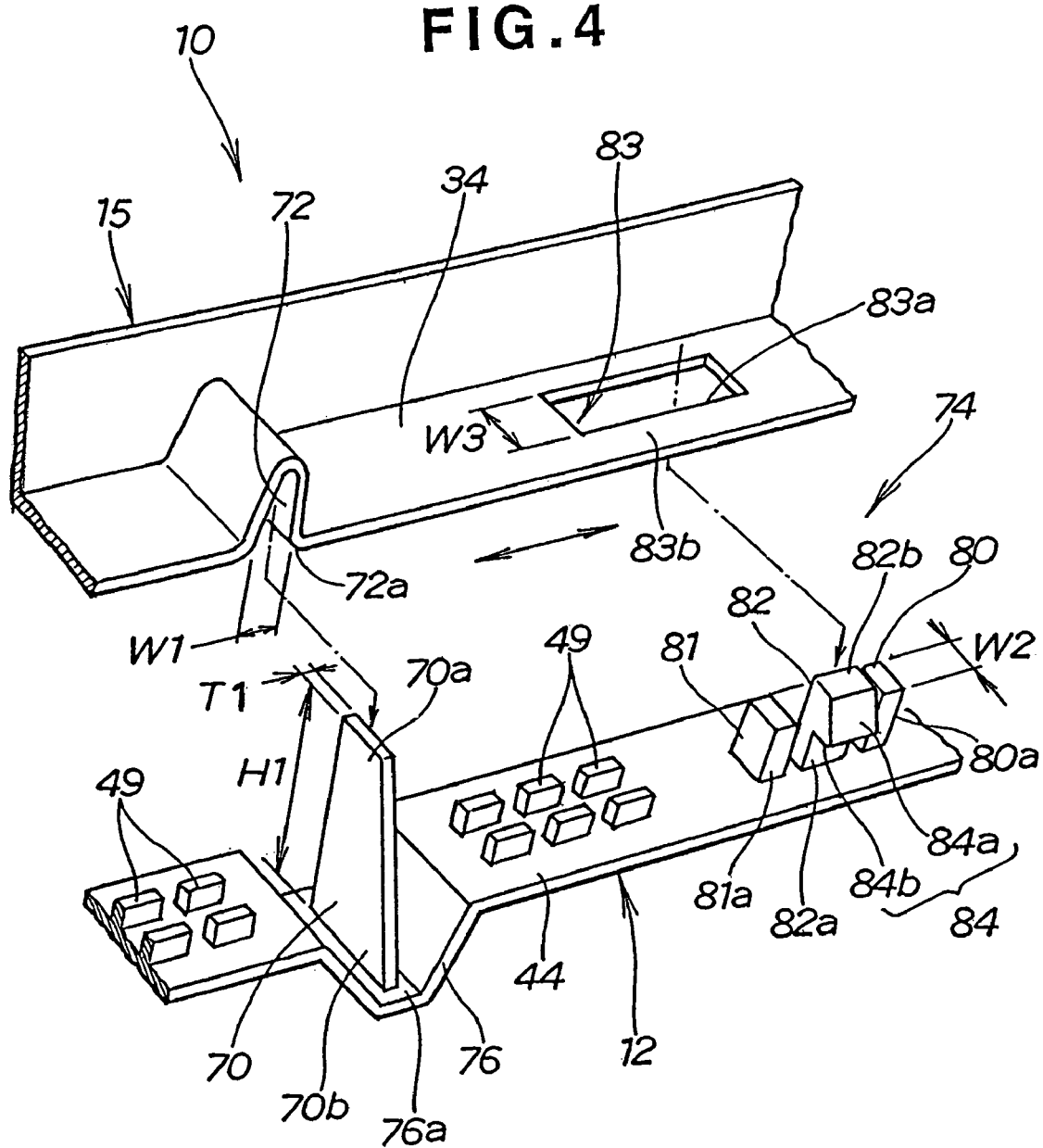
FIG. 4 is an exploded perspective view showing principal sections of the vibration welding structure for fixing an instrument panel attachment in accordance with the present invention.

FIG. 4 is an exploded perspective view showing principal sections of the vibration welding structure for fixing an instrument panel attachment in accordance with the present invention, which particularly shows sections 4a and 4b of FIG. 2 in enlarged scale.

The vibration welding structure 10 includes a first projection 70 projecting from the instruction panel 12 toward the A/C duct 15 and resiliently deformable in a vibrating direction (arrowed direction in the figure), and the A/C duct 15 has a first fitting groove portion (fitting portion) 72 for fitting engagement with a distal end portion 70a of the first projection 70. Further, a first positioning mechanism 74 is provided between the instrument panel 12 and the A/C duct 15 for positioning the A/C duct 15 in a direction perpendicular to the vibrating direction.

The first projection 70 is formed on the fifth panel welding portion 44 of the instrument panel 12. Specifically, the fifth panel welding portion 44 has a concavely bent region or recessed portion 76, and the first projection 70 is formed on a bottom surface 76a of the to extend in the direction perpendicular to the 25 vibrating direction (arrowed direction). The first projection 70 has a generally trapezoidal shape progressively decreasing in width from its proximal end 70b to the distal end.

By thus forming the recessed portion 76 in the fifth panel welding portion 44 and forming the first projection 70 on the bottom surface 76a of the concavely bent region 76, it is possible to secure a relatively great height H1 of the projection 70. With the great height H1 of the first projection 70, the projection 70 can be resiliently deformed efficiently in the vibrating direction when a force is applied, in the vibrating direction, to the distal end portion 70a of the projection 70.

Note that the fifth panel welding portion 44 has the vibration welding ribs 49 as noted above in relation to FIG. 2.

The first fitting groove portion 72 is formed in the duct welding portion 34 of the A/C duct 15. Specifically, the first fitting groove portion 72 is formed to face the distal end of the first projection 70 so that the groove portion 72 can be fitted around the distal end portion 70a of the first projection 70.

The first fitting groove portion 72 has a sectional shape of an inverted V and an opening width W1 greater than a thickness T1 of the first projection 70. Thus, a given spacing can be left between the surface of the first fitting groove portion 72 defining an opening 72a and the first projection 70.

Thus, the first projection 70 can be resiliently deformed efficiently in the vibrating direction when a force is applied, in the vibrating direction, to the distal end portion 70a of the projection 70.

The first positioning mechanism 74 comprises a pair of spaced-apart left and right locking blocks 80 and 81 formed on the fifth panel welding portion 44 of the instrument panel 12, a locking claw 82 formed on the panel welding portion 44 between the left and right locking blocks, and an opening portion 83 for fitting engagement around the left and right locking blocks 80 and 81 and locking claw 82.

The left and right locking blocks 80 and 81 each have a width W2 slightly smaller than a width W3 of the opening portion 83. Respective rear surfaces 82a of the left and right locking blocks 80 and 81 lie flush with a rear surface 82a of the locking claw 82; in an alternative, however, the rear surfaces 82a of the left and right locking blocks 80 and 81 may slightly project rearwardly beyond the rear surface 82a of the locking claw 82.

The locking claw 82 has a distal end 82b located above distal ends of the left and right locking blocks 80 and 81, and it has a claw portion 84 projecting rearwardly from the distal end 82b. The claw portion 84 has a slanted or tapering rear surface 84a and a lower end surface 84b extending parallel to the general plane of the fifth panel welding portion 44.

According to the first positioning mechanism 74, when the opening portion 83 of the fifth duct welding portion 34 is fitted around the left and right locking blocks 80 and 81 and claw portion 84, an edge 83a of the opening portion 83 is pressed against the slanted rear surface 84a of the claw portion 84 until the edge 83a of the opening portion 83 gets over, i.e. slides downward beyond the lower end of, the slanted rear surface 84a by resiliently deforming the claw portion 84.

After the edge 83a of the opening portion 83 has got over the slanted rear surface 84a, the claw portion 84 of the locking claw 82 is released from the resilient deformation so that the claw portion 84 lockingly engages with a peripheral surface area 84b surrounding the opening portion 83. Concurrently, the left and right locking blocks 80 and 81 fit into the opening portion 83.

Note that, although the embodiment is described as employing the first positioning mechanism 74, the first positioning mechanism 74 maybe dispensed with and the A/C duct 15 maybe properly positioned using only the first projection 70 and first fitting groove portion 72.

Figure 5:
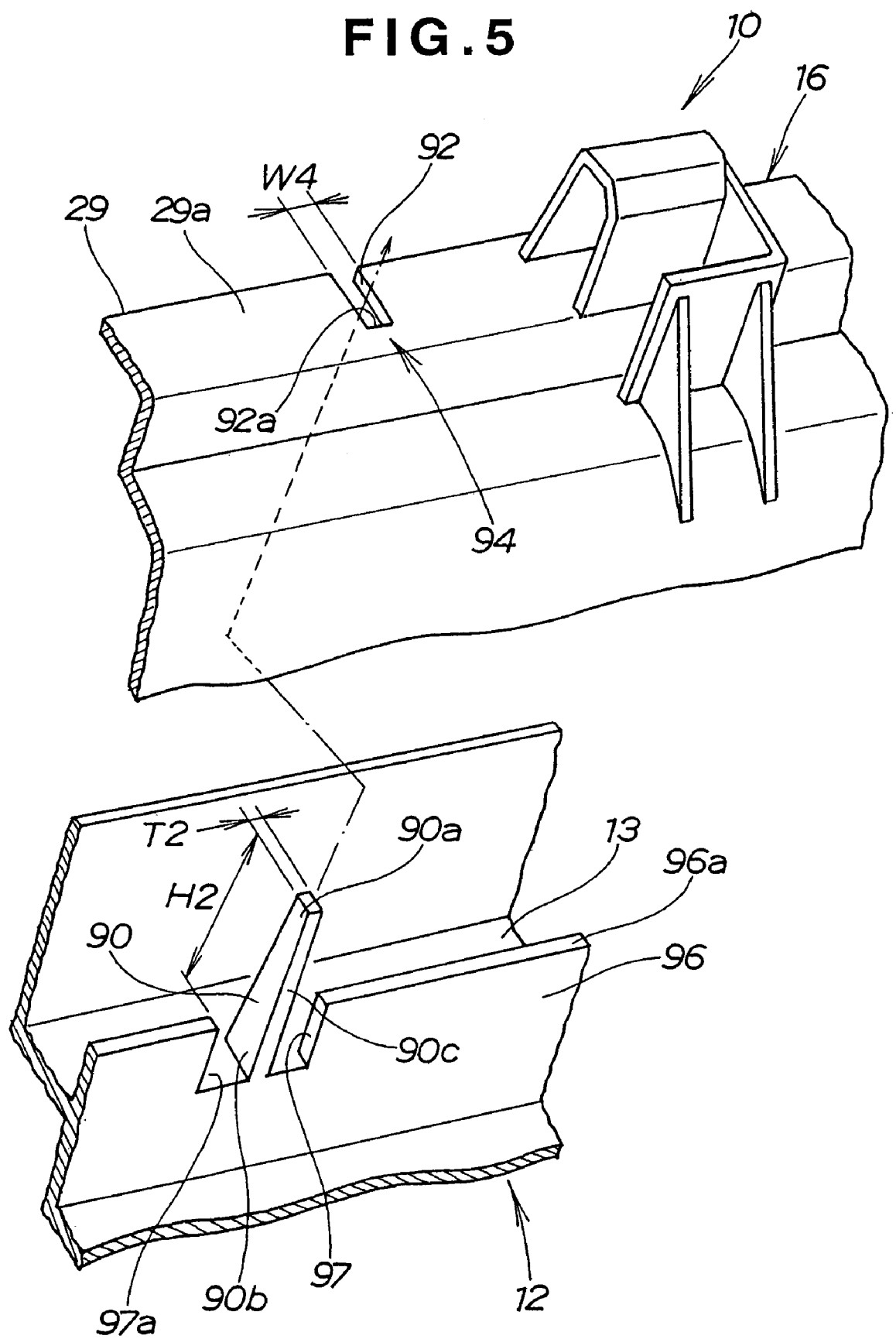
FIG. 5 is an exploded perspective view showing principal sections of the inventive vibration welding structure for fixing an instrument panel attachment in accordance with the present invention.

FIG. 5 is an exploded perspective view showing the principal sections of the inventive vibration welding structure for fixing an instrument panel attachment, which particularly shows sections 5a and 5b of FIG. 3 in enlarged scale.

As shown, the vibration welding structure for fixing an instrument panel attachment also includes a second projection 90 projecting from the instruction panel 12 toward the defroster duct 16 and resiliently deformable in the above-mentioned vibrating direction, and the defroster duct 16 has a second fitting groove portion (fitting portion) 92 for fitting engagement with a distal end portion 90a of the second projection 90. Further, a second positioning mechanism 94 is provided between the instrument panel 12 and the defroster duct 16 for positioning the defroster duct 16 in the direction perpendicular to the vibrating direction.

The second projection 90 is formed on a front end portion 13 of the instrument panel 12. Specifically, the instrument panel 12 has a reinforcing rib 96 formed on the front end portion 13, and a recessed portion 97 is formed in the reinforcing rib 96. More specifically, the second projection 90 is formed on a bottom surface 97a of the recessed portion 97 to extend in a direction perpendicular to the vibrating direction (arrowed direction). The second projection 90 has a shape progressively decreasing in width from its proximal end 90b to the distal end.

By thus forming the recessed portion 97 in the reinforcing rib 96 on the front end portion 13 of the instrument panel 12 and forming the second projection 90 on the bottom surface 97a of the recessed portion 97, it is possible to secure a relatively great height H2 of the projection 90. With the great height H2 of the second projection 90, the projection 90 can be resiliently deformed efficiently in the vibrating direction when a force is applied, in the vibrating direction, to the projection 90.

Further, a second fitting groove portion 92 is formed in a surface area 29a surrounding the central blowoff opening 29 of the defroster duct 16. Specifically, the second fitting groove portion 92 is formed to face the distal end of the second projection 90, so that the second fitting groove portion 92 can be fitted around the second projection 90 in a direction from the distal end to the proximal end 90b of the second projection 90.

The second fitting groove portion 92 has a width W4 slightly greater than a thickness T2 of the second projection 90.

The second positioning mechanism 94 is intended to position the defroster duct 16 relative to the instrument panel 12 in the direction perpendicular to the vibrating direction, by placing a rear edge 90c of the second projection 90 in abutting engagement with a bottom surface 92a of the second fitting groove portion 92.

Note that, although the embodiment is described as employing the second positioning mechanism 94, the second positioning mechanism 94 may be dispensed with and the defroster duct 16 can be properly positioned using only the second projection 90 and second fitting groove portion 92.

Figure 6:
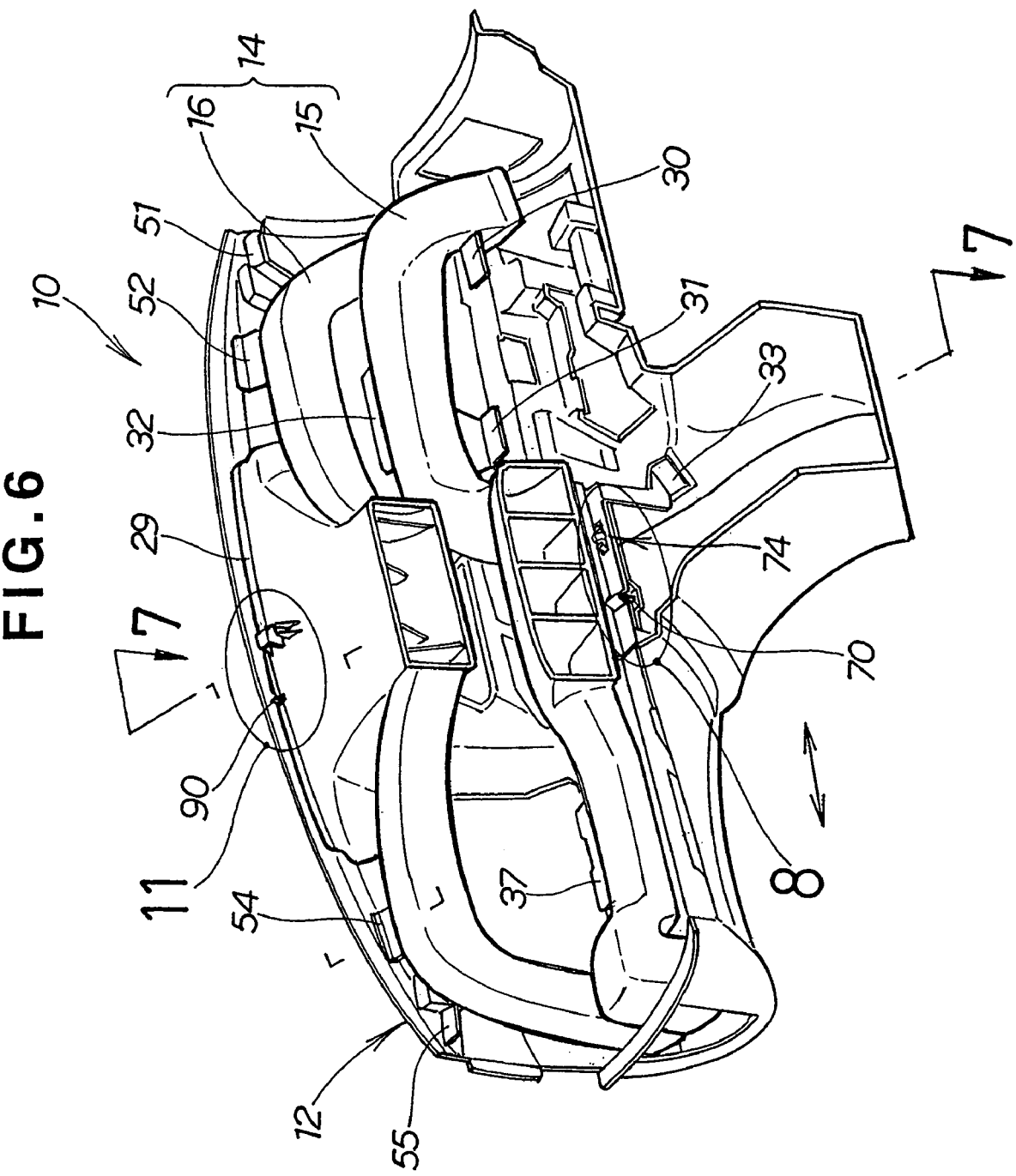
FIG. 6 is a rear perspective view of the vibration welding structure for fixing an instrument panel attachment in accordance with the present invention.

FIG. 6 is a rear perspective view of the vibration welding structure for fixing an instrument panel attachment in accordance with the present invention.

According to the vibration welding structure for fixing an instrument panel attachment 10, the air conditioning duct unit 14, i.e. A/C duct 15 and defroster duct 16, are first positioned on and along the instrument panel 12 and then vibration-welded to the instrument pane 112 by vibrating the A/C duct 15 and defroster duct 16 in the arrowed direction of the figure.

Figure 7:
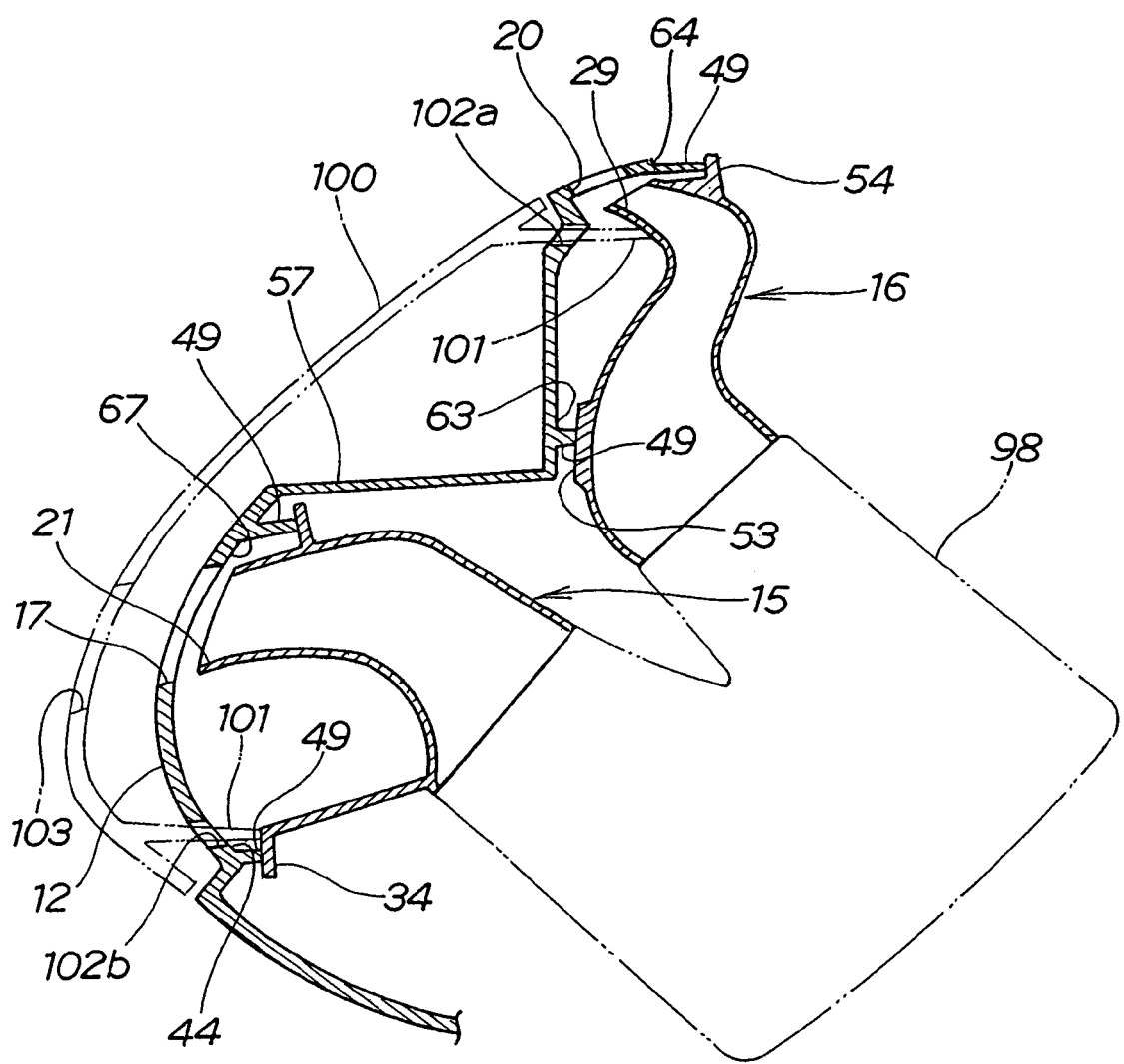
FIG. 7 is a sectional view taken along line 7—7 of FIG. 6.

FIG. 7 is a sectional view taken along line 7—7 of FIG. 6.

As shown, the fifth panel welding portion 44 of the instrument panel 12 has the welding ribs 49, and the fifth duct welding portion 34 of the A/C duct 15 is vibration-welded to the welding ribs 49. Also, the seventeenth panel welding portion 67 of the instrument panel 12 has the welding ribs 49, and the seventeenth duct welding portion 57 of the A/C duct 15 is vibration-welded to the welding ribs 49. In this way, the A/C duct 15 is securely fixed to the instrument panel 12.

At that time, the central blowoff openings 21 of the A/C duct 15 can be oriented to face and communicate with the vehicle compartment via the central opening 17 of the instrument panel 12.

On the other hand, the thirteenth panel welding portion 63 of the instrument panel 12 has the welding ribs 49, and the thirteenth duct welding portion 53 of the defroster duct 16 is vibration-welded to the welding ribs 49. Also, the fourteenth panel welding portion 64 of the instrument panel 12 has the welding ribs 49, and the fourteenth duct welding portion 54 of the defroster duct 16 is vibration-welded to the welding ribs 49. In this way, the defroster duct 16 is securely fixed to the instrument panel 12.

At that time, the central blowoff opening 29 of the defroster duct 16 can be oriented to face and communicate with the vehicle compartment via the defroster opening 20 of the instrument panel 12.

Further, on the face of the instrument panel confronting the vehicle compartment, there is provided a safety pad 100 as indicated by a phantom line in FIG. 7. The safety pad 100 has a plurality of welding ribs 101 on its back. After passing the welding ribs 101 through upper and lower through-holes 102a and 102b, the distal ends of the welding ribs 101 can be vibration-welded to the A/C duct 15 and defroster duct 16.

At that time, a central aperture 103 of the safety pad 100 can be oriented to face and communicate with the vehicle compartment via the central opening 17 of the instrument panel 12.

In this way, air supplied from an air conditioner 98 into the A/C duct 15 can be blown out into the vehicle compartment via the central opening 17 of the instrument panel 12 and central aperture 103 of the safety pad 100.

Also, air supplied from the air conditioner 98 into the defroster duct 16 can be blown out into the vehicle compartment via the defroster opening 20 of the instrument panel 12.

Figure 8:
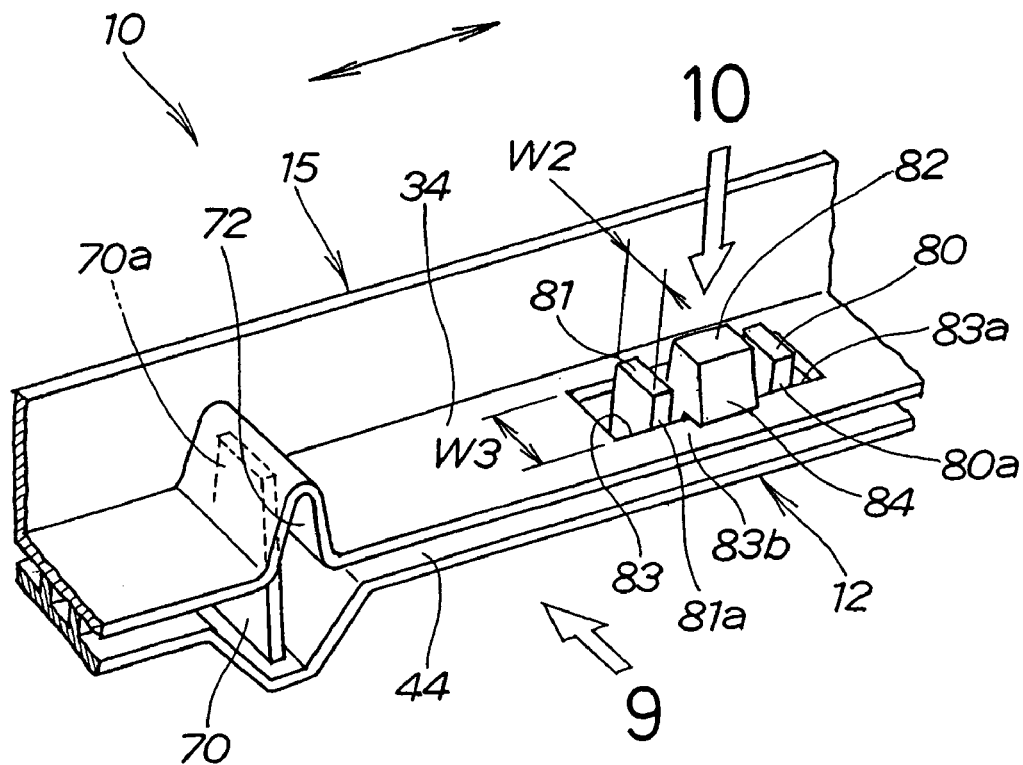
FIG. 8 is a view showing a circled portion 8 of FIG. 6 in enlarged scale.

FIG. 8 is a view showing a circled portion 8 of FIG. 6 in enlarged scale.

FIG. 8 shows how the first projection 70 is formed on the fifth panel welding portion 44 of the instrument panel 12, and how the first fitting groove portion 72 is formed in the fifth duct welding portion 34 of the A/C duct 15 and fitted around the first projection 70.

FIG. 8 also shows how the left and right locking blocks 80 and 81 and locking claw 82 are formed on the fifth panel welding portion 44 of the instrument panel 12, and how the opening portion 83 is formed in the fifth duct welding portion 34 of the A/C duct 15 and fitted around the locking blocks 80 and 81 and locking claw 82.

Thus, the surface area 83b surrounding the opening portion 83 of the A/C duct 15 can be lockingly engaged with the claw portion 84 of the locking claw 82.

Figure 9:
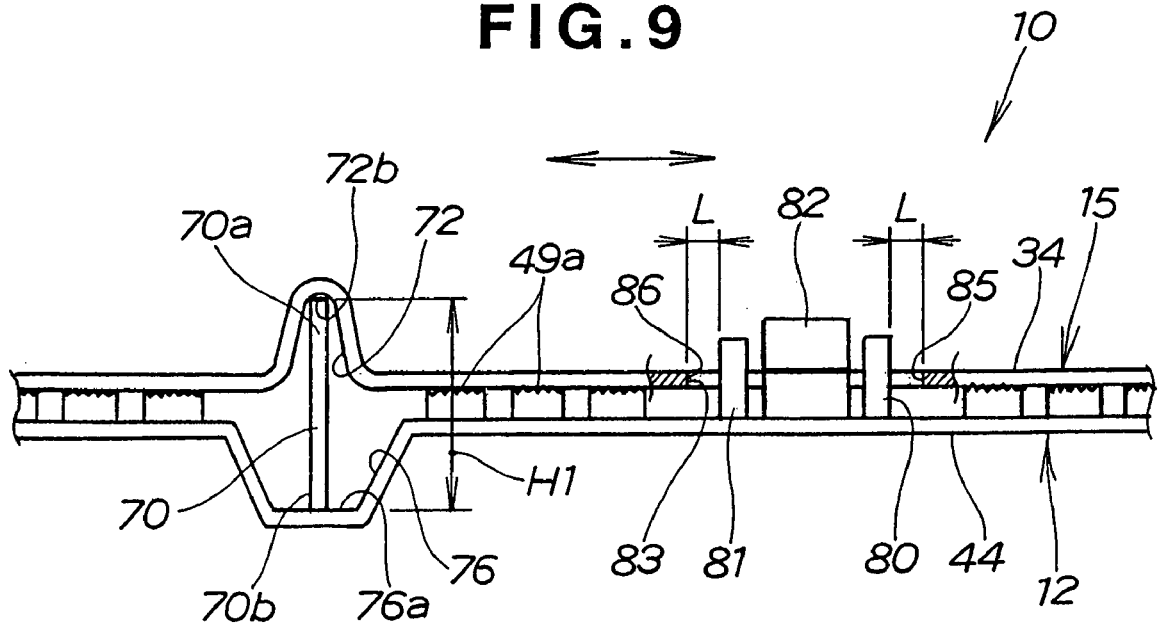
FIG. 9 is an enlarged view of the vibration welding structure taken in a direction of arrow 9 of FIG. 8.

FIG. 9 is an enlarged view of the welding structure 10 taken in a direction of arrow 9 of FIG. 8.

As shown, the first fitting groove portion 72 is fitted around the distal end portion 70a of the first projection 70 so that the bottom surface 72b of the groove portion 72 is positioned close to or in abutting engagement with the distal end portion 70a of the first projection 70.

Concurrently, the left and right locking blocks 80 and 81 and locking claw 82 are fitted in the opening portion 83 of the A/C duct 15.

FIG. 9 also shows how the fifth duct welding portion 34 is vibration-welded to the top 49a of the welding ribs 49 so that the fifth duct welding portion 34 of the A/C duct 15 is joined to the fifth panel welding portion 44 of the instrument panel 12. In this way, the A/C duct 15 is securely fixed to the instrument panel 12.

Here, the first projection 70 can have a relatively great height H1 with the first projection 70 formed on the bottom surface 76a of the recessed portion 76 of the fifth panel welding portion 44.

Thus, the first projection 70 can be resiliently deformed efficiently in the vibrating direction when a force is applied, in the vibrating direction, to the distal end portion 70a of projection 70.

Further, there are provided a relatively great distance L from the left locking block 80 to a left side edge 85 of the opening portion 83 and a relatively great distance L from the right locking block 81 to a right side edge 86 of the opening portion 83. With such great distances L, it is possible to vibrate the A/C duct 15 in the arrowed direction while effectively preventing the left and right locking blocks 80 and 81 from interfering with the left and right side edges 85 and 86, respectively.

Figure 10:
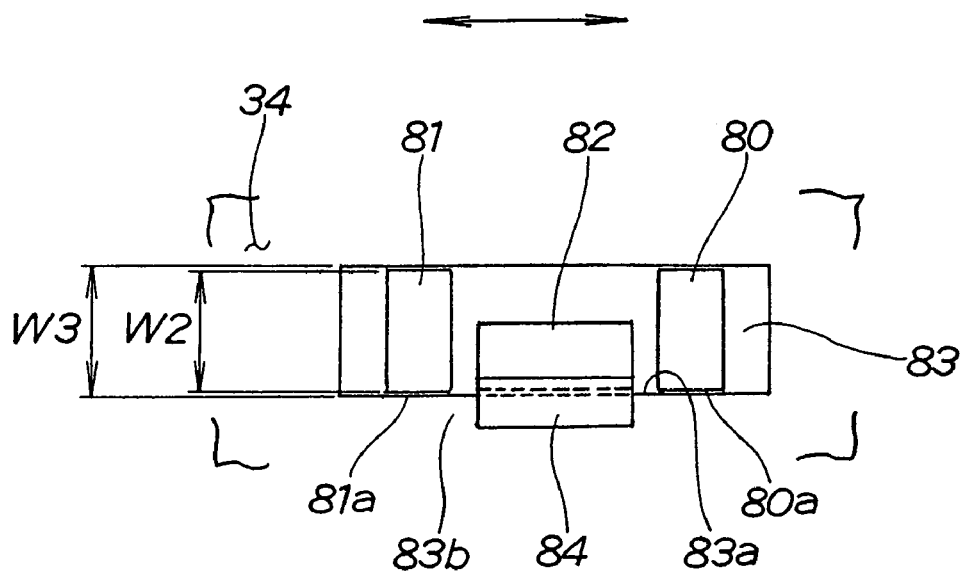
FIG. 10 is an enlarged view of the vibration welding structure taken in a direction of arrow 10 of FIG. 8.

FIG. 10 is an enlarged view of the welding structure 10 taken in a direction of arrow 10 of FIG. 8.

Because the left and right locking blocks 80 and 81 each have the width W2 slightly smaller than the width W3 of the opening portion 83, there can be left only a very small gap between the left and right locking blocks 80 and 81 and the peripheral edge of the opening portion 83.

Consequently, the opening portion 83 of the A/C duct 15 can be lockingly engaged with the locking blocks 80 and 81 against displacement in the direction perpendicular to the vibrating direction (arrowed direction).

Figure 11:
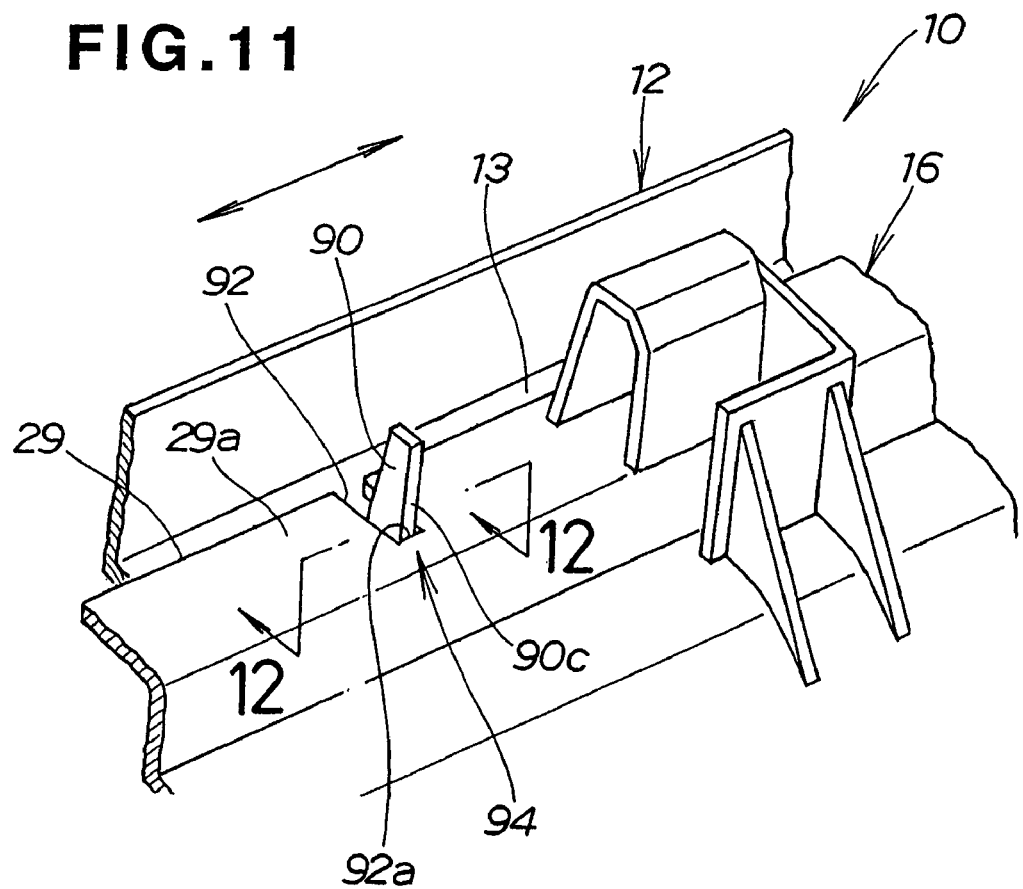
FIG. 11 is a view showing a circled portion 11 of FIG. 6 in enlarged scale.

FIG. 11 is a view showing a circled portion 11 of FIG. 6 in enlarged scale.

FIG. 11 shows how the second projection 90 is formed on the front end portion 13 of the instrument panel 12, and how the second fitting groove portion 92 is formed in the surface area 29a surrounding the central blowoff opening 29 of the defroster duct 16 and fitted around the second projection 90.

The bottom surface 92a of the second fitting groove portion 92 is held in abutting engagement with the rear edge 90c of the second projection 90, so that the defroster duct 16 is positioned properly relative to the instrument panel 12 in the direction perpendicular to the vibrating direction (arrowed direction).

Figure 12:
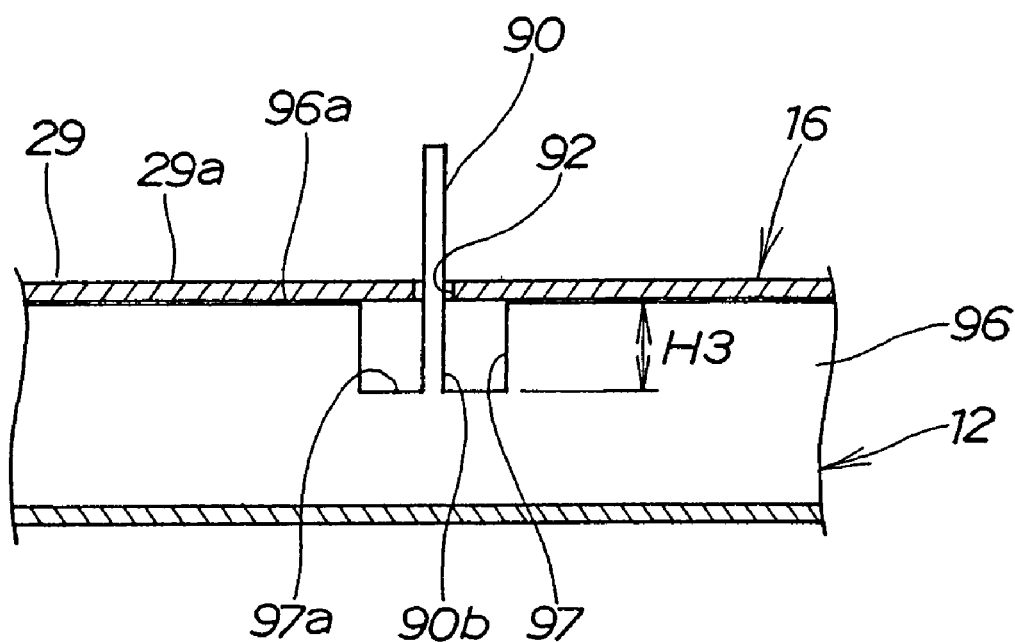
FIG. 12 is a sectional view taken along line 12—12 of FIG. 11.

FIG. 12 is a sectional view taken along line 12—12 of FIG. 11.

As shown, the second fitting groove portion 92 is fitted around the second projection 90 with the surface area 29a surrounding the central blowoff opening 29 of the defroster duct 16 placed on an upper end surface 96a of the reinforcing rib 96 formed on the front end portion 13 of the instrument panel 12.

With the reinforcing rib 96 projecting beyond the front end portion 13 of the instrument panel 12 (see FIG. 5) and the surface area 29a, surrounding the central blowoff opening 29 of the defroster duct 16, placed on the upper end surface 96a of the reinforcing rib 96, the surface area 29a can be located at a predetermined height H3 from the proximal end of the second projection 90.

With the surface area 29a thus located at the predetermined height H3 from the proximal end of the second projection 90, the projection 90 can be resiliently deformed efficiently in the vibrating direction when a force is applied, in the vibrating direction, to the projection 90.

Now, a description will be given about operation of the vibration welding structure for fixing an instrument panel attachment, with reference to FIGS. 8–11 and 13–15.

Figure 13:
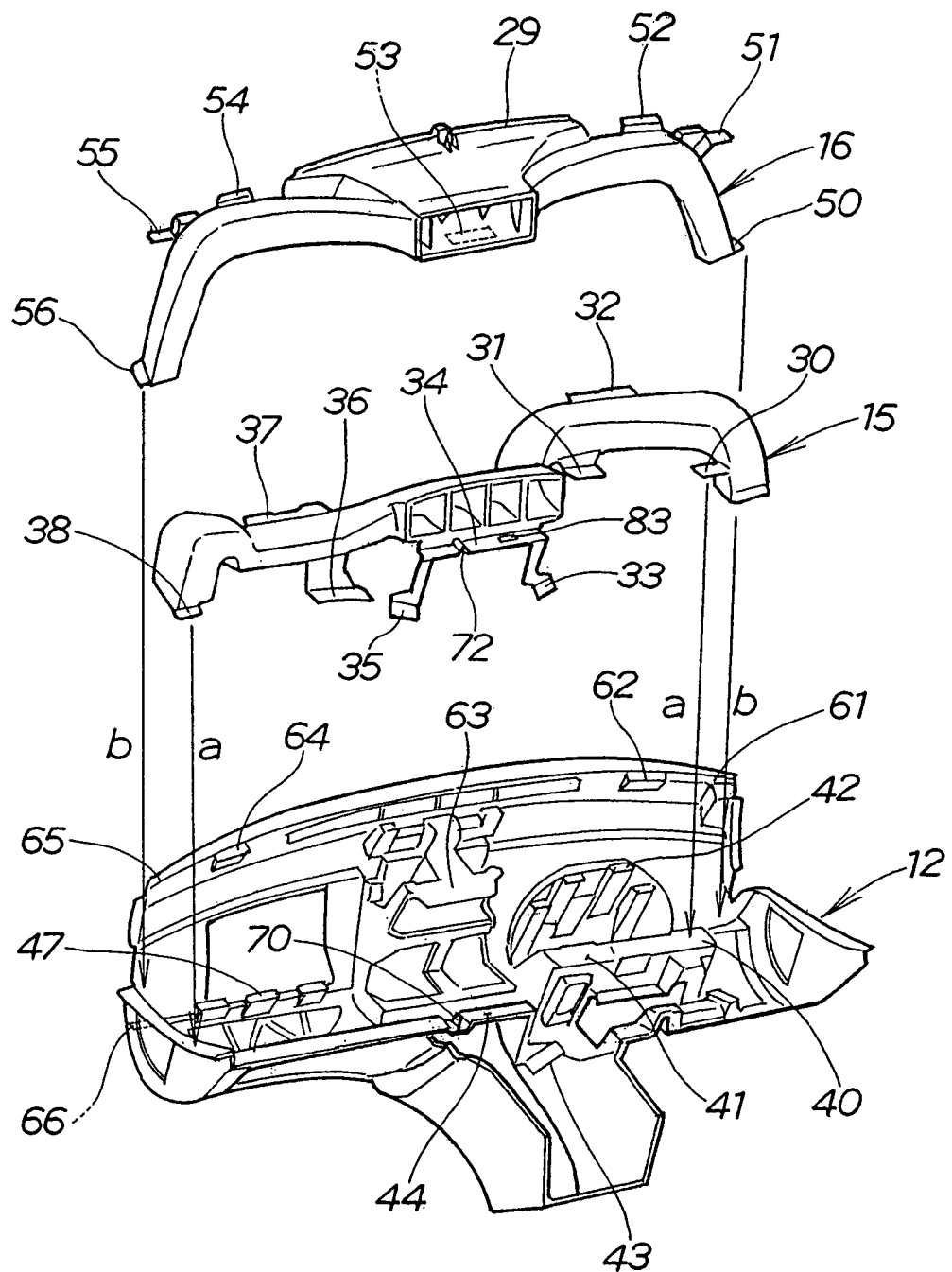
FIG. 13 is a view explanatory of a first vibration welding step performed to provide the vibration welding structure of the present invention.

FIG. 13 is a view explanatory of a first vibration welding step performed to provide the vibration welding structure for fixing an instrument panel attachment of the present invention.

The A/C duct 15 is moved as indicated by arrow "a" so that the first to ninth duct welding portions 30–38 of the A/C duct 15 are placed on the first to ninth panel welding portions 40–48 of the instrument panel 12 (sixth, seventh and ninth panel welding portions 45, 46 and 48 are shown in FIG. 2, but not in FIG. 13 for purposes of simplicity).

Further, the defroster duct 16 is moved as indicated by arrow "b" so that the tenth to sixteenth duct welding portions 50–56 of the A/C duct 16 are placed on the tenth to sixteenth panel welding portions 60–66 of the instrument panel 12.

Figure 14A:
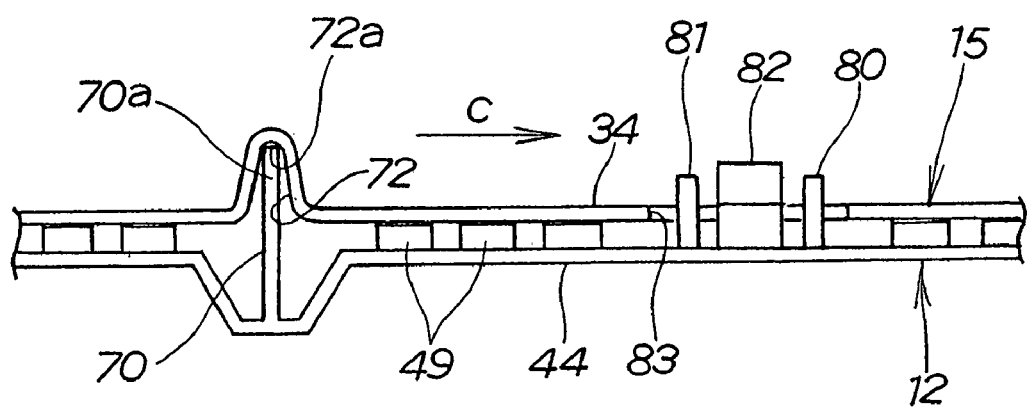
FIGS. 14A and 14B are views explanatory of a second vibration welding step performed to provide the vibration welding structure of the present invention.
Figure 14B:
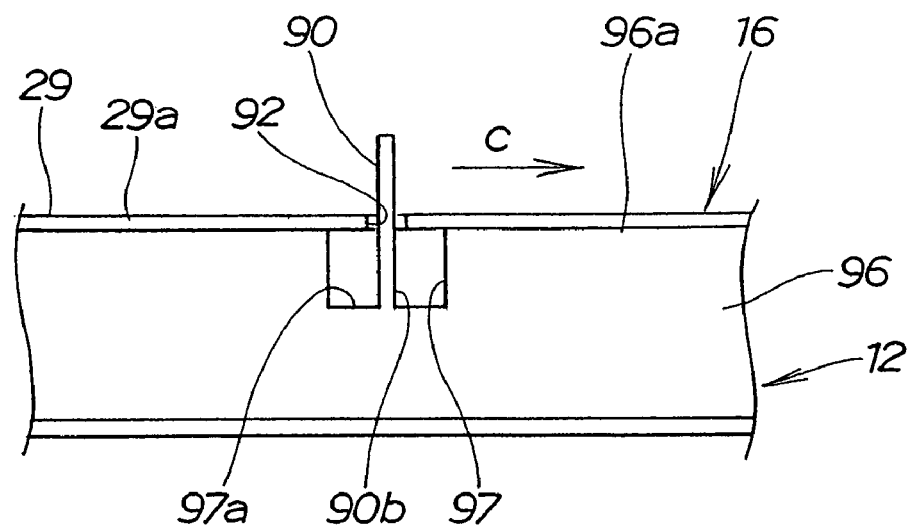

FIGS. 14A and 14B are views explanatory of a second vibration welding step performed to provide the vibration welding structure for fixing an instrument panel attachment of the present invention.

As shown in FIG. 14A, as the duct welding portions 30–38 of the A/C duct 15 are placed on the corresponding panel welding portions 40–48 of the instrument panel 12 (see FIG. 13), the first fitting groove portion 72 can be fitted around the distal end portion 70a of the first projection 70; thus, the A/C duct 15 can be positioned properly on the predetermined position with respect to the vibrating direction.

In addition, the opening portion 83 of the A/C duct 15 can be fitted around the left and right locking blocks 80 and 81 and locking claw 82.

Because, as illustrated in FIGS. 8 and 10, the left and right locking blocks 80 and 81 each have the width W2 slightly smaller than the width W3 of the opening portion 83, there can be left only a very small gap between the left and right locking blocks 80 and 81 and the inner peripheral edge of the opening portion 83.

With the above-described arrangements, the opening portion 83 of the A/C duct 15 can be lockingly engaged with the locking blocks 80 and 81 against displacement in the direction perpendicular to the vibrating direction (arrowed direction).

Consequently, in setting the A/C duct 15 on the instrument panel 12, the A/C duct 15 can be readily positioned properly both in the vibrating direction and in the direction perpendicular to the vibrating direction, without imposing a heavy load on the human operator.

Further, as shown in FIG. 14B, as the duct welding portions 50–56 of the defroster duct 16 are placed on the corresponding panel welding portions 60–66 of the instrument panel 12 (see FIG. 13), the second fitting groove portion 92 can be fitted around the distal end portion 90a of the second projection 90; thus, the defroster duct 16 can be positioned properly on the predetermined position with respect to the vibrating direction.

In addition, the bottom surface 92a of the second fitting groove portion 92 can be held in abutting engagement with the rear edge 90c of the second projection 90. Thus, the defroster duct 16 can be lockingly engaged against displacement, relative to the instrument panel 12, in the direction perpendicular to the vibrating direction (arrowed direction).

Consequently, in setting the defroster duct 16 on the instrument panel 12, the defroster duct 16 can be readily positioned properly both in the vibrating direction and in the direction perpendicular to the vibrating direction, without imposing a heavy load on the human operator.

After the A/C duct 15 and defroster duct 16 have been duly set on the instrument panel 12, the A/C duct 15 and defroster duct 16 are vibrated with a predetermined pressing force applied to the two ducts 15 and 16.

Namely, first, the A/C duct 15 is vibrated in a direction of arrow "c" in FIG. 14A, and the defroster duct 16 is vibrated in a direction of arrow "c" in FIG. 14B.

FIGS. 15A to 15D are views explanatory of a third a vibration welding step performed to provide the vibration welding structure for fixing an instrument panel attachment of the present invention.

Figure 15A:
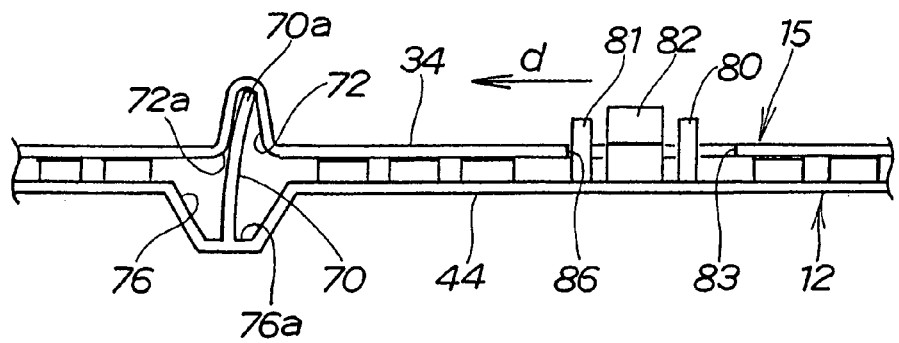
FIGS. 15A to 15D are views explanatory of a third a vibration welding step performed to provide the vibration welding structure of the present invention.

As shown in FIG. 15A, the A/C duct 15 can be resiliently vibrated leftward relative to the instrument panel 12 by the first projection 70 being resiliently deformed in the vibrating direction.

At that time, the A/C duct 15 can be resiliently vibrated leftward without the right locking block 81 interfering with the right side edge 86 because of the relatively great distance L from the right locking block 81 to the right side edge 86 of the opening portion 83 as illustrated in FIG. 9.

Here, the first projection 70 can have the great height H1 (see FIG. 4) with the first projection 70 formed on the bottom surface 76a of the recessed portion 76 of the fifth panel welding portion 44.

Further, the first fitting groove portion 72 has a sectional shape of an inverted V, and the width W1 of the opening 72a in the first fitting groove portion 72 is greater than the thickness T1 of the first projection 70. Thus, a given spacing can be left between the surface of the first fitting groove portion 72 defining the opening 72a and the first projection 70.

With the great height H1 of the first projection 70 and the spacing between the surface of the first fitting groove portion 72 defining the opening 72a and the first projection 70, the first projection 70 can be resiliently deformed efficiently in the vibrating direction when a force is applied, in the vibrating direction, to the distal end portion 70a of projection 70.

Figure 15B:
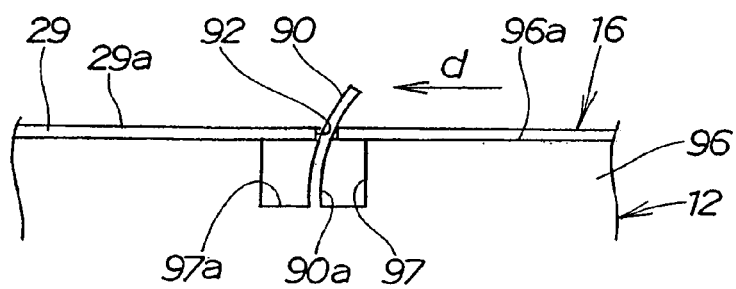

Further, as shown in FIG. 15B, the defroster duct 16 can be resiliently vibrated leftward relative to the instrument panel 12 by the second projection 90 being resiliently deformed in the vibrating direction.

Here, the second projection 90 can have the great height H2 (see FIG. 5) with the recessed portion 97 formed in the reinforcing rib 96 on the front end portion 13 of the instrument panel 12 and the second projection 90 formed on the bottom surface 97a of the recessed portion 97.

By virtue of the great height H2 of the second projection 90, the second projection 90 can be resiliently deformed efficiently in the vibrating direction when a force is applied to the projection 90.

After the A/C duct 15 and defroster duct 16 have been resiliently vibrated leftward, the two ducts 15 and 16 are vibrated in a direction of arrow "d".

Figure 15C:
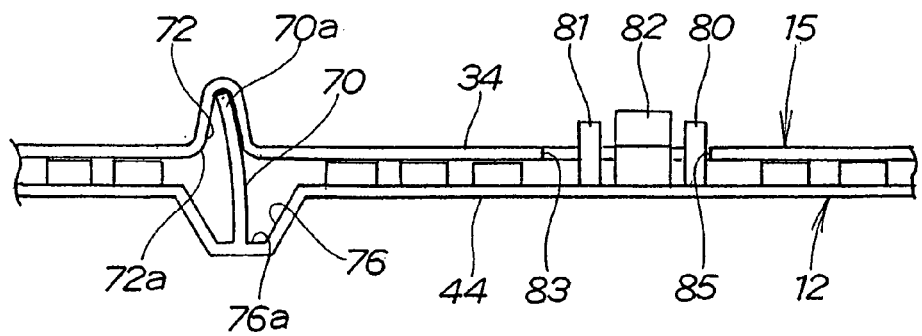

Further, in FIG. 15C, the A/C duct 15 can be resiliently vibrated rightward relative to the instrument panel 12 by the first projection 70 being resiliently deformed in the vibrating direction, in a similar manner to FIG. 15A.

At that time, the A/C duct 15 can be resiliently vibrated rightward without the left locking block 80 interfering with the left side edge 85 because of the relatively great distance L from the left locking block 80 to the left side edge 85 of the opening portion 83 as illustrated in FIG. 9.

Here, because the first projection 70 can have the great height H1(see FIG. 4) and a given spacing can be left between the surface of the first fitting groove portion 72 defining the opening 72a and the first projection 70, the first projection 70 can be resiliently deformed efficiently in the vibrating direction when a force is applied, in the vibrating direction, to the distal end portion 70a of projection 70.

Figure 15D:
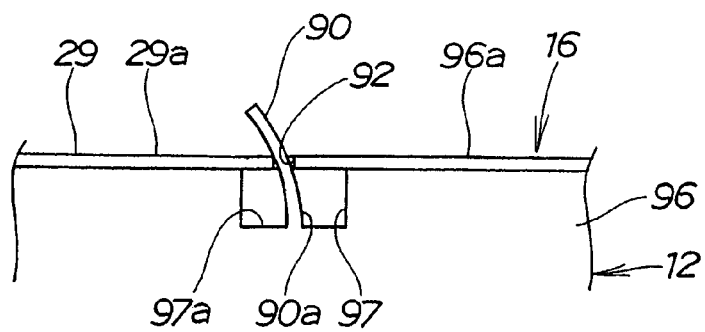
Figure 16A:
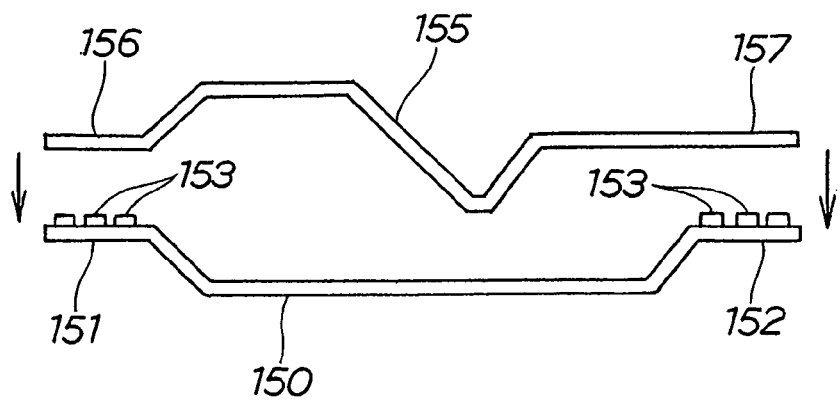
FIGS. 16A to 16C are views explanatory of a conventional vibration welding structure for fixing an instrument panel attachment.
Figure 16B:
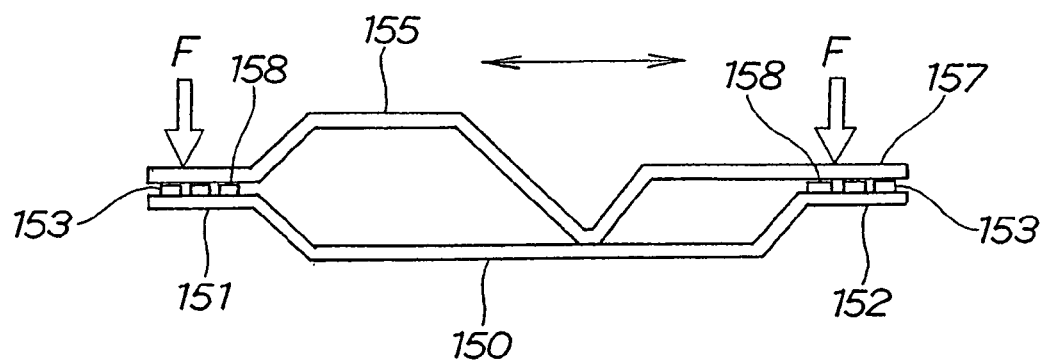
Figure 16C:
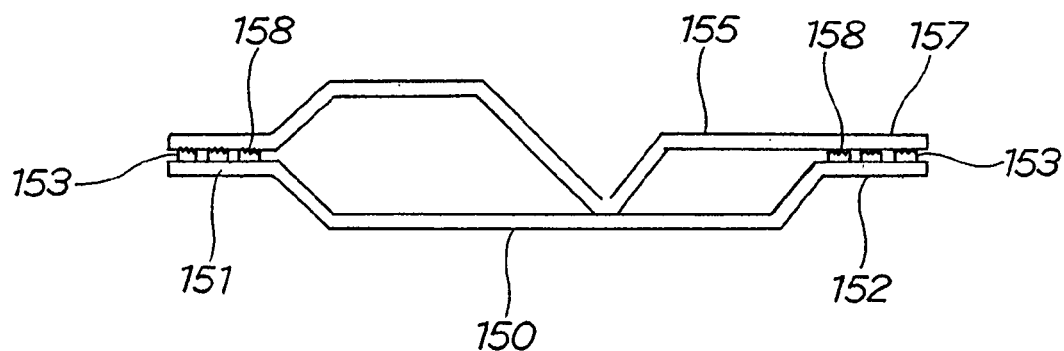

Further, in FIG. 15D, the defroster duct 15 can be resiliently vibrated rightward relative to the instrument panel 12 by the second projection 90 being resiliently deformed in the vibrating direction.

As described earlier in relation to FIG. 15B, the great height H2(see FIG. 5) of the second projection 90 allows the projection 90 to be resiliently deformed efficiently when a force is applied to the projection 90.

Then, the vibration in the leftward and rightward directions (i.e., directions of arrows "c" and "d") is repeated to vibration-weld the respective welding duct welding portions 30–38 and 50–57 of the A/C duct 15 and defroster duct 16 to the welding ribs 49 of the instrument panel 12, so that the A/C duct 15 and defroster duct 16 can be securely fixed to the instrument panel 12.

Whereas the embodiments of the present invention have been described above in relation to the case where the instrument panel 12 and air conditioning duct unit 14 are formed of olefin-based thermoplastic resin, any other suitable kind of thermoplastic resin may be used to form the panel 12 and duct 14. However, the use of the olefin-based thermoplastic resin is more advantageous in that the instrument panel 12 and air conditioning duct unit 14 that the instrument panel 12 and air conditioning duct unit 14 can be recycled with increased ease.

Further, while the embodiments of the present invention have been described above in relation to the case where the air conditioning duct unit 14 is securely fixed through vibration welding to the instrument panel 12 as an attachment to the panel 12, any other suitable attachment than the air conditioning duct unit 14 may be vibration welded to the instrument panel 12 using the basic principles of the invention.

Furthermore, while the embodiments of the present invention have been described above in relation to the case where the first and second projections 70 and 90 are provided on the instrument panel 12 and the first and second fitting groove portions 72 and 92 are provided in the air conditioning duct unit 14, the present invention is not so limited. For example, the first and second projections 70 and 90 may be provided on the air conditioning duct unit 14, and the first and second fitting groove portions 72 and 92 are provided in the instrument panel 12.

Furthermore, the embodiments of the present invention have been described above in relation to the case where one projection 70 and one fitting groove portion 70 are provided in the instrument panel 12 and A/C duct 15, respectively, as one means for positioning the attachment in the vibrating direction and one projection 90 and one fitting groove portion 92 are provided in the instrument panel 12 and defroster duct 16, respectively, as another means for positioning the attachment in the vibrating direction. In an alternative, any other numbers of the projections and fitting groove portions may be chosen depending on the shapes of the instrument panel attachments.

According to the present invention, the attachment to be set on the instrument panel can be readily positioned on a predetermined location of the instrument panel by just fitting the fitting groove portion, formed in one of the instrument panel and the attachment, around the projection formed in the other of the instrument panel and the attachment. Also, in the present invention, either one of the instrument panel and the attachment can be vibrated relative to the other by just resiliently deforming the projection, so that the attachment can be readily vibration-welded to the instrument panel. As a result, the present invention allows the attachment to be readily set on and vibration-welded to the predetermined position of the instrument panel without imposing a heavy load on a human operator, which can enhance productivity. With such arrangements, the present invention is extremely useful in applications to the automobile industry.

The invention claimed is:

1. A vibration welding structure for fixing an instrument panel attachment wherein the attachment is vibration-welded to an instrument panel by first positioning said attachment on and along the instrument panel and then vibrating either one of the instrument panel and the attachment, wherein a projection having a generally trapezoidal shape progressively decreasing in width from a proximal end thereof to a distal end thereof and being resiliently deformable in a predetermined vibrating direction is provided on one of the instrument panel and the attachment so as to project toward the other of the instrument panel and the attachment, wherein a fitting portion is provided in the other of the instrument panel and the attachment for fitting engagement with a distal end portion of said projection, said one of the instrument panel and the attachment has a recessed portion facing said fitting portion in the other of the instrument panel and the attachment, said projection is disposed on the recessed portion and projecting therefrom toward the fitting portion, said fitting portion comprises a groove for receiving therein the distal end portion of the protection, and wherein positioning means for positioning said attachment relative to the instrument panel in a direction perpendicular to the predetermined vibrating direction is provided between said instrument panel and said attachment, and wherein said positioning means comprises:

at least one locking block disposed on one of the instrument panel and the attachment, and an opening portion formed in the other of the instrument panel and the attachment for fitting engagement with the at least one locking block in said direction perpendicular to the predetermined vibrating direction.

2. The vibration welding structure as claimed in claim 1, wherein said positioning means further comprises a locking claw formed on said one of the instrument panel and the attachment and interlocked with an edge of the opening portion.

* * * * *